US012789438B2

(12) United States Patent
Tsuji et al.

(10) Patent No.: US 12,789,438 B2
(45) **Date of Patent: *Nov. 10, 2026**

(54) METHOD AND SYSTEM FOR MANUFACTURING TIRE MEMBER

(71) Applicant: THE YOKOHAMA RUBBER CO., LTD., Kanagawa (JP)

(72) Inventors: Mitsuo Tsuji, Kanagawa (JP); Yuichiro Hisada, Kanagawa (JP); Satoshi Onodera, Kanagawa (JP)

(73) Assignee: The Yokohama Rubber Co., LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/850,925

(22) PCT Filed: Dec. 23, 2022

(86) PCT No.: PCT/JP2022/047663
§ 371 (c)(1),
(2) Date: Sep. 25, 2024

(87) PCT Pub. No.: WO2023/188641
PCT Pub. Date: Oct. 5, 2023

(65) Prior Publication Data

US 2025/0108548 A1 Apr. 3, 2025

(30) Foreign Application Priority Data

Mar. 31, 2022 (JP) ................................ 2022-059708

(51) Int. Cl.
*B29C 48/92* (2019.01)
*B29C 48/00* (2019.01)
(Continued)

(52) U.S. Cl.
CPC .......... *B29C 48/92* (2019.02); *B29C 48/0021* (2019.02); *B29C 48/307* (2019.02);
(Continued)

(58) Field of Classification Search
CPC ......... B29C 48/18; B29C 48/19; B29C 48/20; B29C 48/21; B29C 48/307; B29C 48/49;
(Continued)

(56) References Cited

U.S. PATENT DOCUMENTS 4,037,104 A * 7/1977 Allport ................ G01B 15/025 250/359.1
4,803,715 A * 2/1989 Cho ..................... G01B 15/025 378/90

(Continued)

FOREIGN PATENT DOCUMENTS

JP H07-2944458 A 11/1995
JP 8-86635 A 4/1996

(Continued)

*Primary Examiner* — Xiao S Zhao
*Assistant Examiner* — Joseph S Leyson
(74) *Attorney, Agent, or Firm* — Thorpe North & Western

(57) ABSTRACT

Continuously performed is a process of applying, by an X-ray inspection device, X-rays to a predetermined length range from a top surface side of a tire member while conveying the tire member in a longitudinal direction by using a conveying device to acquire image data based on X-ray transmittance. The image data of the predetermined length range continuous without gaps in the longitudinal direction is acquired. Based on contrast in each piece of the image data, a magnitude of variation in the longitudinal direction of a distribution of a constituent member formed of unvulcanized rubber having a larger mass and a higher content rate of a specific component in the tire member is calculated by a calculation device. The variation is corrected by controlling, based on the magnitude of the variation, a
(Continued)

rotation speed of a screw disposed in at least one extruder by a control device.

14 Claims, 9 Drawing Sheets

(51) Int. Cl.

| | |
|---|---|
| ***B29C 48/305*** | (2019.01) |
| ***B29C 48/495*** | (2019.01) |
| ***G01N 23/04*** | (2018.01) |
| ***G01N 23/18*** | (2018.01) |
| *B29K 507/04* | (2006.01) |
| *B29L 30/00* | (2006.01) |

(52) U.S. Cl.
CPC ........... *B29C 48/495* (2019.02); *G01N 23/04* (2013.01); *G01N 23/185* (2013.01); *B29C 2948/92295* (2019.02); *B29C 2948/92438* (2019.02); *B29C 2948/9259* (2019.02); *B29C 2948/92885* (2019.02); *B29K 2507/04* (2013.01); *B29L 2030/002* (2013.01); *G01N 2223/645* (2013.01)

(58) Field of Classification Search
CPC .................. B29C 48/495; B29C 48/92; B29C 2948/92114; B29C 2948/92295; B29C 2948/92438; B29C 2948/9259; B29C 2948/92885; B29K 2507/04; B29L 2030/002
See application file for complete search history.

(56) References Cited

U.S. PATENT DOCUMENTS

| | | | | | |
|---|---|---|---|---|---|
| 5,128,077 | A * | 7/1992 | Stevenson | B29C 48/07 425/141 |
| 5,843,349 | A * | 12/1998 | Anders | B29C 48/92 264/40.5 |
| 6,294,119 | B1 * | 9/2001 | Nakamura | B29C 48/07 264/173.17 |
| 2013/0154144 | A1 * | 6/2013 | Ripple | B29C 48/92 425/131.1 |
| 2019/0080943 | A1 * | 3/2019 | Kim | H01L 21/67253 |
| 2020/0408706 | A1 * | 12/2020 | Kono | G01N 23/223 |
| 2021/0225088 | A1 * | 7/2021 | Sivakumar | G06F 3/165 |

FOREIGN PATENT DOCUMENTS

| | | | |
|---|---|---|---|
| JP | 2010-217119 | A | 9/2010 |
| JP | 2017-081545 | A | 5/2017 |

* cited by examiner

METHOD AND SYSTEM FOR MANUFACTURING TIRE MEMBER

TECHNICAL FIELD

The present technology relates to a method and a system for manufacturing a tire member and particularly to a method and a system for manufacturing a tire member that can reduce variation in predetermined quality in a longitudinal direction of an elongated tire member formed by bonding a plurality of types of constituent members and productively manufacture the tire member.

BACKGROUND ART

Tires are manufactured by using various elongated tire members. Some of these tire members are formed by bonding a plurality of types of constituent members such as different types (compositions) of rubber and reinforcing materials. In a tire manufacturing line, various inspections are performed to determine quality of these tire members.

As a known method for manufacturing a tire member while inspecting quality of the tire member, a manufacturing method of determining and measuring the shape, dimensions, and the like of each constituent member in a cross-section of the tire member without stopping a manufacturing line and feeding back the measurement results to an extruder of the tire member to reset appropriate extrusion conditions has been proposed (see Japan Unexamined Patent Publication No. H08-086635 A). In this proposed manufacturing method, buffer means (a festoon mechanism) that accumulates tire members is disposed on a conveyance path including a transfer system such as a belt conveyor configured to convey the tire members, and a CT (computed tomography) scanner is disposed on the downstream side of the buffer means. During inspection of the inside of the tire member by the CT scanner, the conveyance is temporarily stopped for a portion corresponding to an inspection range of the tire member. On the other hand, the extruder disposed on the upstream side of the buffer means continues to extrude tire members, and the extruded tire members are temporarily accumulated by the buffer means. Thus, the manufacturing line is avoided from being stopped without interrupting the extrusion of the tire members by the extruder even during the inspection of the tire members by the CT scanner on the conveyance path.

In the manufacturing method proposed in Japan Unexamined Patent Publication No. H08-086635 A, in order to accurately determine the magnitude of variation in predetermined quality of the tire member in a longitudinal direction, it is necessary to subdivide the tire member into a large number of sections in the longitudinal direction without gaps, temporarily stop the conveyance, and inspect each of the subdivided sections by using the CT scanner. As a result, it takes quite a substantial amount of time to convey the inspected tire member through the conveyance path to the next step, which brings disadvantages for improving productivity. On the other hand, for the purpose of improving productivity, a section in which inspection is performed is thinned out in order to reduce the number of times of temporarily stopping of the conveyance of the tire member toward the downstream side of the CT scanner in association with the inspection by the CT scanner. In such a case, the magnitude of variation in predetermined quality of the tire member in the longitudinal direction cannot be accurately determined. This brings disadvantages for reducing the variation in predetermined quality of the tire member in the longitudinal direction. Thus, there is room for improvement in productively manufacturing the tire member while reducing variation in predetermined quality in the longitudinal direction.

SUMMARY

A method for manufacturing a tire member according to an embodiment of the present technology is a method for manufacturing, while determining predetermined quality of an elongated tire member formed by bonding a plurality of types of constituent members made of unvulcanized rubber extruded by a plurality of respective extruders, the tire member. The method includes: continuously performing a process of applying X-rays to a predetermined length range of the tire member from a top surface side of the tire member while conveying the tire member in a longitudinal direction to acquire image data based on X-ray transmittance of the predetermined length range; acquiring the image data of the predetermined length range continuous without gaps in the longitudinal direction; determining, based on contrast in each piece of the image data acquired, a magnitude of variation in the predetermined quality of the tire member in the longitudinal direction; and correcting the variation by controlling, based on the magnitude of the variation determined, a rotation speed of a screw disposed in at least one of the plurality of extruders.

A system for manufacturing a tire member according to an embodiment of the present technology is a system for manufacturing a tire member including a plurality of extruders configured to extrude constituent members made of a plurality of different types of unvulcanized rubber and manufacturing, while determining predetermined quality of an elongated tire member formed by bonding the plurality of types of constituent members, the tire member. The system includes: a conveying device configured to convey the tire member in a longitudinal direction; an X-ray inspection device configured to apply X-rays to a predetermined length range of the tire member from a top surface side of the tire member being conveyed by the conveying device to acquire image data based on X-ray transmittance of the predetermined length range; a calculation device to which the image data is input; and a control device configured to control rotation of a screw disposed in each of the extruders. The system has a configuration in which a process of acquiring the image data is continuously performed, the image data of the predetermined length range continuous without gaps in the longitudinal direction is acquired, based on contrast in each piece of the image data acquired, a magnitude of variation in the predetermined quality of the tire member in the longitudinal direction is calculated by the calculation device, and the variation is corrected by controlling, based on the magnitude of the variation calculated, a rotation speed of a screw disposed in at least one of the extruders by the control device.

An embodiment of the present technology uses the image data acquired by applying the X-rays to the predetermined length range from the top surface side of the tire member while conveying the tire member in the longitudinal direction, and thus it is not necessary to stop the conveyance of the tire member in order to determine the predetermined quality. The image data of the predetermined length range continuous without gaps in the longitudinal direction is acquired, and the predetermined quality can be accurately determined based on the contrast in each piece of the acquired image data. Thus, it is advantageous to quickly and accurately determine the magnitude of variation in the predetermined quality of the tire member in the longitudinal direction. The rotation speed of the screw disposed in at least one of the plurality of extruders is controlled based on the magnitude of variation accurately gasped, thereby correcting the variation in the predetermined quality in the longitudinal direction. As a result, it is advantageous to reduce the variation in the predetermined quality of the tire member in the longitudinal direction and to productively manufacture the tire member.

DETAILED DESCRIPTION

Figure 1:
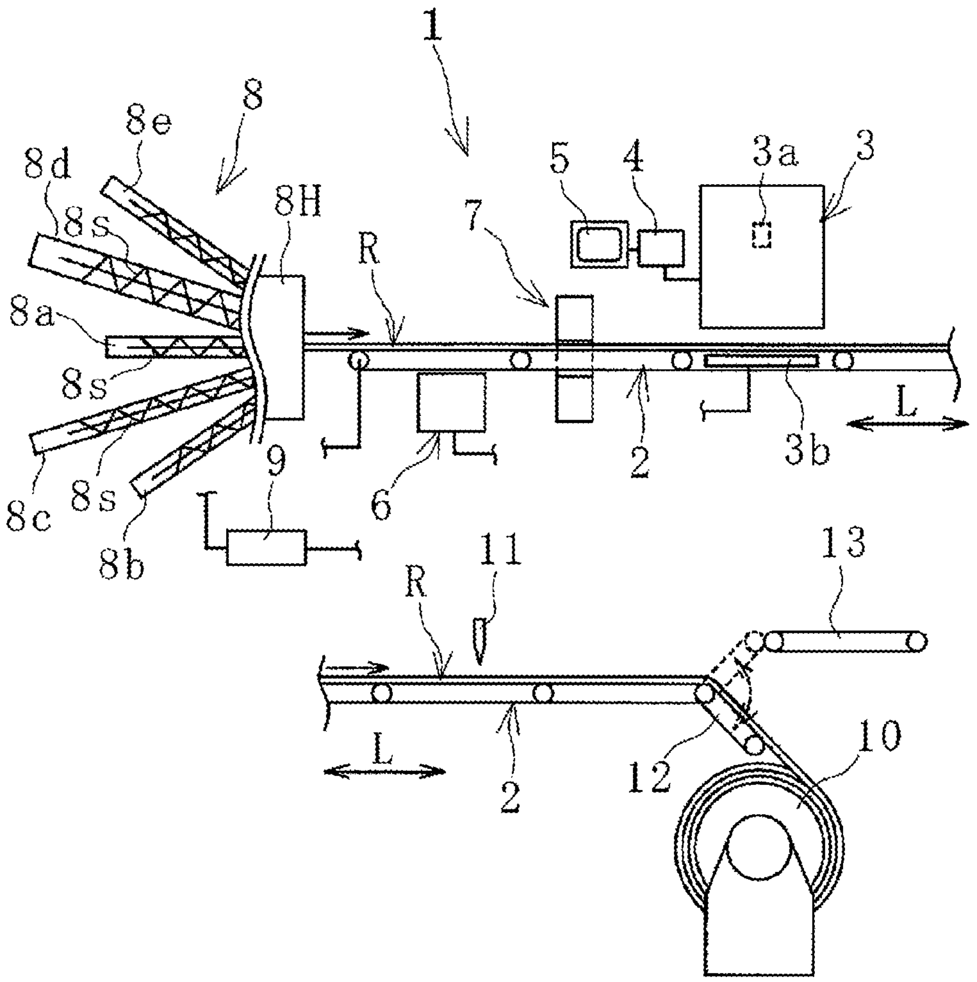
FIG. 1 is an explanatory diagram illustrating an embodiment of a system for manufacturing a tire member in a side view.

A method and a system for manufacturing a tire member according to an embodiment of the present technology will be described below with reference to drawings.

An embodiment of a manufacturing system 1 for a tire member illustrated in FIGS. 1 to 5 manufactures a tire member R while determining predetermined quality of the tire member R formed by bonding a plurality of types of constituent members M1 to M5. An arrow L and an arrow W in the drawing respectively indicate a longitudinal direction and a width direction of the tire member R.

Figure 6:
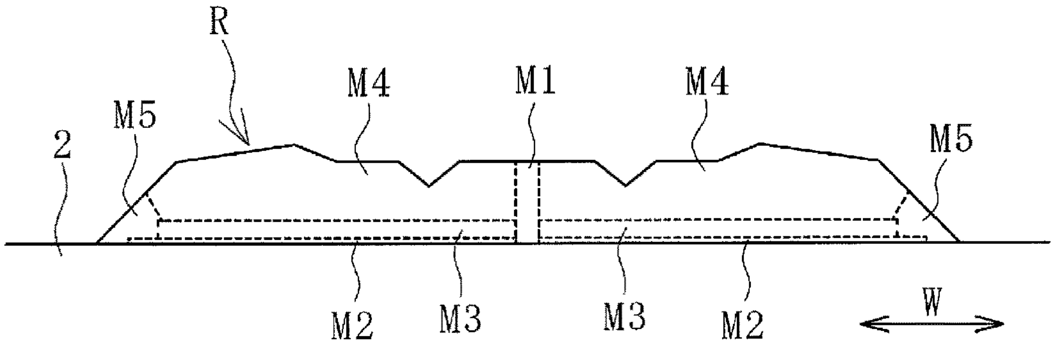
FIG. 6 is an explanatory diagram illustrating a tire member in a cross-sectional view.
Figure 7:
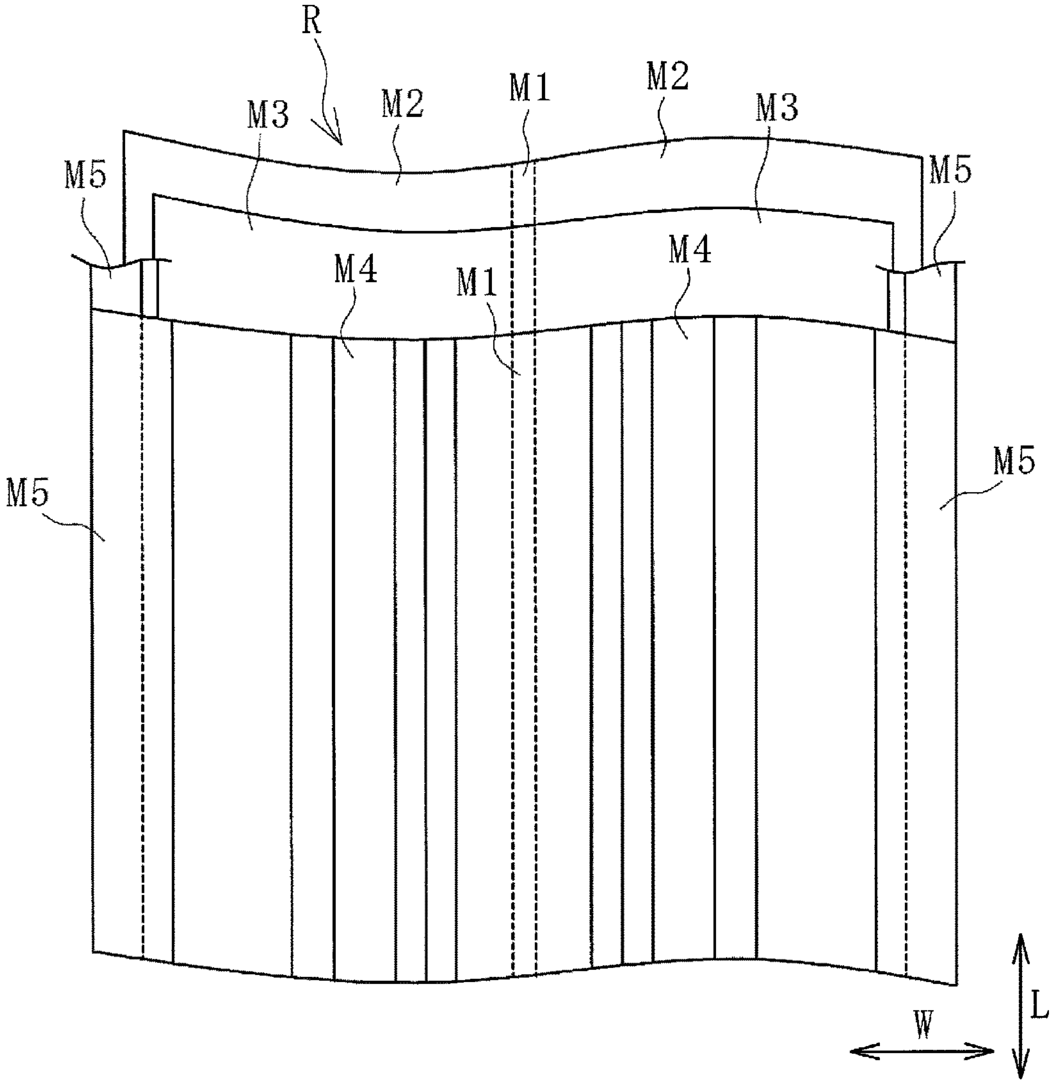
FIG. 7 is an explanatory diagram illustrating a partially cut-out view of the tire member of FIG. 6 in a plan view.

In this embodiment, the elongated tire member R formed by bonding the plurality of types of constituent members M (M1 to M5) as illustrated in FIGS. 6 and 7 is manufactured. The tire member R is a tread rubber in which the plurality of types of constituent members M1 to M5 made of unvulcanized rubber respectively extruded by a plurality of extruders 8 (8*a* to 8*e*) are bonded. The tire member R to be manufactured is not limited to the tread rubber but may be a variety of known members mainly made of rubber such as side rubber and used for manufacturing a tire.

The constituent members M1 to M5 are different types of unvulcanized rubber, which corresponds to, for example, a case where different compounding agents are blended into the same type of raw rubber, a case where the same compounding agents are blended into the same type of raw rubber in different blend amounts, a case where different compounding agents are blended into different types of raw rubber, and a case where the same compounding agents are blended into different types of raw rubber in different blended amounts.

The number of types of constituent members M is not limited to five as long as there are a plurality of types. For example, the number of types of constituent members M is about two or more and eight or less. The size of the tire member R is not particularly limited; however, the length is, for example, several meters or more and some hundreds of meters or less, the width is, for example, 10 mm or more and 2000 mm or less, and the thickness (maximum thickness) is, for example, 0.3 mm or more and 100 mm or less.

In the tire member R illustrated in FIGS. 6 and 7, the sheet-shaped constituent members M2 and M3 are vertically layered, the constituent member M4 is layered thereon, and the constituent members M5 covering both end portions in the width direction of the constituent members M2 and M3 are layered on both end portions in the width direction. At the central portion of the tire member R in the width direction, the constituent member M1 extends through the tire member R vertically (in the thickness direction). The constituent members M1, M4, and M5 are exposed on the top surface of the tire member R, and the constituent members M1, M2, and M5 are exposed on the back surface of the tire member R. The tire member R is placed on a conveying device 2 with the back surface in contact with the conveying device 2. When the tire member R is a non-defective product, each of the constituent members M1 to M5 extends substantially over the entire length in a longitudinal direction L in the cross-sectional shape illustrated in FIG. 6. In the drawing, boundaries between the constituent members M are indicated by dashed lines.

The constituent member M1 is an earth tread rubber containing a large amount of carbon black and no silica. The constituent member M1 is a member having a substantially rectangular cross-section, having the largest thickness among the constituent members M, and having the highest content rate (weight ratio) of carbon black and the smallest specific gravity (density) among the constituent members M. The dimension in the width direction of the constituent member M1 is, for example, 0.5 mm or more and 50 mm or less.

The constituent member M2 is an adhesive rubber containing carbon black, no silica, or a small amount of silica, and is the thinnest sheet-shaped member among the constituent members M. The constituent member M3 is an undertread rubber containing carbon black and containing no silica or a small amount of silica, and is a sheet-shaped member thicker than the constituent member M2.

The constituent member M4 is a cap rubber containing a large amount of silica instead of carbon black and containing no carbon black or a small amount of carbon black. The constituent member M4 is the second thickest member after the constituent member M1 among the constituent members M, and has recessed and protruded portions extending in the longitudinal direction L on the surface thereof and different thicknesses depending on positions in the width direction. The constituent member M5 is an end rubber containing carbon black and no silica. The constituent member M5 forms an inclined surface of an end surface in the width direction of the tire member R, and has different thicknesses depending on positions in the width direction.

The constituent members M1 to M5 have different specific gravities (densities), and the respective specific gravities (mean values) are determined in advance. Of the constituent members M, the constituent member M4 in which the largest amount of silica is remarkably blended has a large specific gravity compared to the other constituent members M1, M2, M3, and M5. Each of the constituent members M may contain other known components depending on the required performance. Containing no component as described above means not only a case where the component is not contained at all but also a case where a very small amount of the component is contained.

The manufacturing system 1 includes the plurality of extruders 8 (8*a* to 8*e*), the conveying device 2, an X-ray inspection device 3, a calculation device 4, and a control device 9. In this embodiment, the manufacturing system 1 further includes a terahertz wave measuring device 6, a profile sensor 7, a winding machine 10, a cutting machine 11, a sorting conveyor 12, and a discharge conveyor 13; however, these devices can be optionally provided.

A monitor 5 is communicably connected to the calculation device 4. The extruder 8 is disposed on the upstream side of the conveying device 2 in the conveying direction, and the winding machine 10 and the discharge conveyor 13 are arranged side by side via the sorting conveyor 12 on the downstream side in the conveying direction. Although on the conveyance path of the conveying device 2, the terahertz wave measuring device 6, the profile sensor 7, and the X-ray inspection device 3 are arranged in this order from the upstream side to the downstream side in the conveying direction, the arrangement is not limited thereto and can be changed as appropriate. On the downstream side of the X-ray inspection device 3 in the conveying direction on the conveyance path, the cutting machine 11 is disposed above the conveying device 2.

The conveying device 2 conveys the tire member R in the longitudinal direction L. Various known specifications such as a belt conveyor device and a roller conveyor device in which a large number of rotary rollers are arranged can be adopted as the conveying device 2.

The X-ray inspection device 3 includes an irradiation unit 3*a* and a light receiving unit 3*b*. The irradiation unit 3*a* is disposed above the tire member R placed on the conveying device 2, and the light receiving unit 3*b* is disposed below the tire member R. Thus, the tire member R being conveyed by the conveying device 2 passes between the irradiation unit 3*a* and the light receiving unit 3*b* in the vertical direction.

The irradiation unit 3*a* applies X-rays to a predetermined length range C of the tire member R from the top surface side (upper side in the drawing) of the tire member R being conveyed by the conveying device 2 such that the entire width of the tire member R can be covered. The X-rays transmitted through the tire member R are received by the light receiving unit 3*b*. Then, image data D based on the X-ray transmittance of the predetermined length range C of the tire member R to which the X-rays are applied is acquired by the X-ray inspection device 3. The X-ray inspection device 3 having various known specifications can be employed.

The irradiation unit 3*a* continuously or intermittently applies X-rays to acquire each piece of the image data D of the predetermined length range C continuous in the longitudinal direction L. The predetermined length ranges C adjacent to each other in the longitudinal direction L may slightly overlap each other in the longitudinal direction L, but are not separated from each other in the longitudinal direction L. In applying X-rays intermittently, as the conveyance speed of the tire member R by the conveying device 2 is higher or as the predetermined length range C is smaller, the interval becomes shorter and the X-rays are frequently applied. In other words, the lower the conveyance speed by the conveying device 2 is or the larger the predetermined length range C is, the longer the interval at which the X-rays are intermittently applied is.

The size (length) of the predetermined length range C and the conveyance speed by the conveying device 2 can be arbitrarily set, but the size of the predetermined length range C is, for example, about 50 mm (5 mm or more and 1000 mm or less). The conveyance speed by the conveying device 2 is, for example, about 50 mm/s or more and 1000 mm/s or less. A preliminary test or the like is performed and thereby the X-ray irradiation intensity (voltage and current of an X-ray tube) is set to a range in which clearer image data D can be acquired in accordance with the specification of the tire member R to be inspected.

The image data D acquired by the X-ray inspection device 3 is sequentially input to the calculation device 4. Various other data are input to the calculation device 4, and various computational processing is performed by using the installed program. A known computer or the like can be used as the calculation device 4. The calculation device 4 may be provided separately from the X-ray inspection device 3 or may be incorporated as a part of the X-ray inspection device 3.

The image data D acquired by the X-ray inspection device 3 and data (image data and the like) on which computational processing is performed by the calculation device 4 are displayed on the monitor 5. Various known specifications may be employed as the monitor 5.

The terahertz wave measuring device 6 includes a transmitter 6*a* configured to transmit electromagnetic waves (radio waves) at terahertz frequencies (substantially 0.1 THz to 10 THz), and a detector 6*b* configured to detect reflected waves entering the tire member R and reflected thereon. In this embodiment, the transmitter 6*a* and the detector 6*b* are disposed on the back surface side (lower side in the drawing) of the tire member R placed on the conveying device 2.

The electromagnetic waves transmitted from the transmitter 6*a* pass into the tire member R to be reflected at the boundary between the constituent members M. The reflected waves reflected at the boundary are detected by the detector 6*b*. The terahertz wave measuring device 6 calculates the cross-sectional area (cross-sectional shape) of at least one type of the constituent member M unevenly distributed on the back surface side of the tire member R based on the angle of reflection (angle of bend at the boundary) of the reflected waves and the time from transmission to detection of the electromagnetic waves. When the boundary between the constituent members M is greatly changed (the degree of recess/protrusion is large), the reflected waves are diffused, and thus the cross-sectional area (cross-sectional shape) of the constituent member M cannot be accurately calculated. Accordingly, in this embodiment, the cross-sectional areas (cross-sectional shapes) of the flat sheet-shaped constituent members M2 and M3 are calculated by the terahertz wave measuring device 6. A device having known specifications can be employed as the terahertz wave measuring device 6.

The profile sensor 7 includes an irradiation unit 7*a* configured to apply a laser beam and a light receiving unit 7*b* configured to receive reflected light reflected on the outer surface of the tire member R. In this embodiment, a set of the irradiation unit 7$a$ and the light receiving unit 7$b$ is disposed on each of the top surface side (upper side in the drawing) and the back surface side (lower side in the drawing) of the tire member R placed on the conveying device 2.

The laser beam emitted from each of the irradiation units 7$a$ is reflected on the outer surface (outer shell surface) of the tire member R. The reflected light is received by the light receiving unit 7$b$ forming a set with the irradiation unit. The profile sensor 7 calculates the cross-sectional area (cross-sectional shape) of the tire member R based on the angle of reflection of the reflected light and the time from irradiation to reception of the laser beam. A sensor having known specifications can be employed as the profile sensor 7.

The extruder 8 (8$a$ to 8$e$) includes a cylinder in which a rotationally driven screw 8$s$ is disposed. The extruder 8 rotates the screw 8$s$ to feed unvulcanized rubber in which raw rubber and various compounding agents are kneaded to an appropriate viscosity and extrudes the unvulcanized rubber from an extruding head 8H. The extruder 8 having various known specifications can be employed. In this embodiment, since the tire member R is formed of five types of bonded constituent members M1 to M5, five of the extruders 8$a$ to 8$e$ are used. Different types of unvulcanized rubber, which form the corresponding constituent members M1, M2, M3, M4, and M5, are respectively extruded from the extruders 8$a$, 8$b$, 8$c$, 8$d$, and 8$e$. The respective unvulcanized rubber extruded by the extruders 8$a$ to 8$e$ passes through the extruding head 8H to be bonded and extruded as the integrated tire member R from the extruding head 8H.

The control device 9 controls the rotation of the screw 8$s$ of each extruder 8. The control device 9 is communicably connected to the calculation device 4, and a variety of data is input from the calculation device 4 to the control device 9. The control device 9 controls the rotation speed of the screw 8$s$ of each extruder 8 based on the variety of input data. A known computer can be used as the control device 9.

The winding machine 10 winds and temporarily stocks the tire member R conveyed by the conveying device 2. The winding machine 10 includes a take-up drum configured to wind the tire member R together with a liner. In an extrusion molding direct line or the like in which the manufactured tire member R is used immediately in the next step, the winding machine 10 is not necessary.

The cutting machine 11 cuts across the tire member R placed on the conveying device 2. A known cutter such as a rotary round blade is employed as the cutting machine 11.

The sorting conveyor 12 pivots upward and downward about one end portion (an upstream end portion in the conveying direction). The tire member R conveyed by the conveying device 2 is guided to the winding machine 10 when the other end portion of the sorting conveyor 12 pivots downward, and is guided to the discharge conveyor 13 when the other end portion of the sorting conveyor 12 pivots upward.

Hereinafter, an example of a procedure of manufacturing the tire member R while determining the magnitude of variation in predetermined quality of the tire member R in the longitudinal direction L by applying the present technology will be described. First, a case will be described in which the distribution in the longitudinal direction L of the dimension in the width direction of the constituent member M1 formed of unvulcanized rubber having a higher content rate of a specific component (carbon black) than those of the other constituent members M1 to M5 is determined as the predetermined quality.

Figure 2:
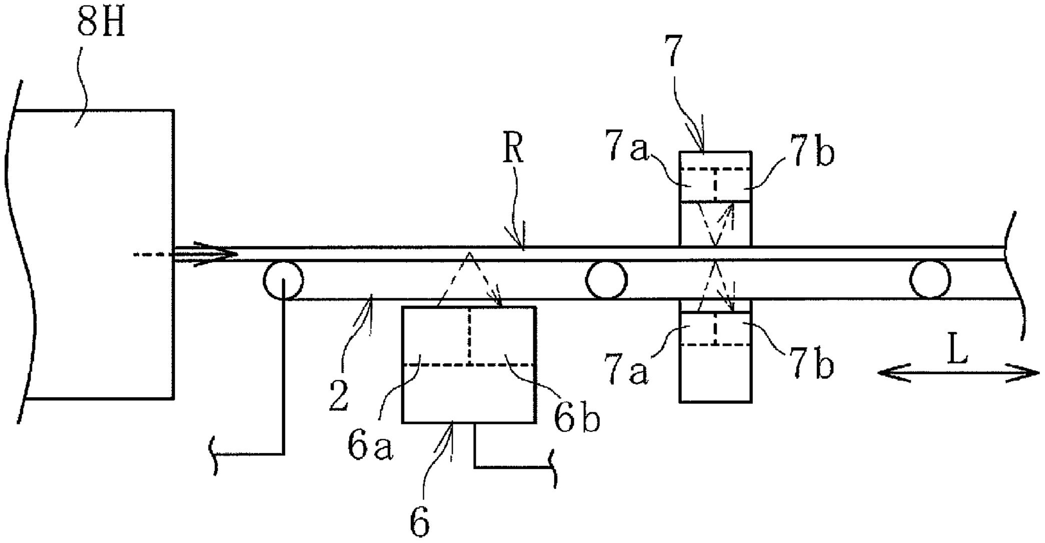
FIG. 2 is an enlarged explanatory diagram illustrating the surroundings of a terahertz wave measuring device and a profile sensor of FIG. 1.
Figure 3:
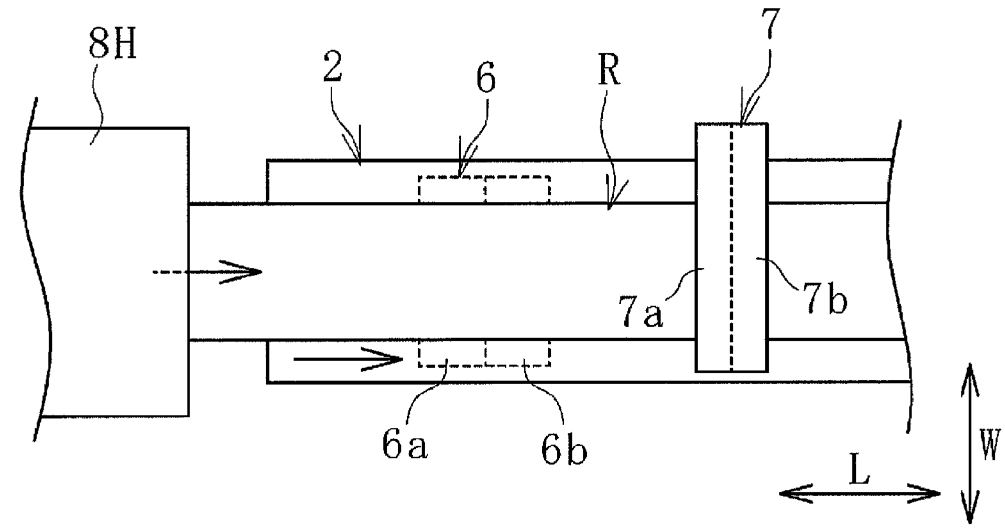
FIG. 3 is an explanatory diagram illustrating the range illustrated in FIG. 2 in a plan view.

As illustrated in FIG. 1, the tire member R extruded from the extruder 8 through the extruding head 8H is placed on the conveying device 2 disposed on the front side and is conveyed in the longitudinal direction L. In this conveying process, as illustrated in FIGS. 2 and 3, the quality inspection of the tire member R is performed by using the terahertz wave measuring device 6 and the profile sensor 7 while conveying the tire member R in the longitudinal direction L.

Figure 8:
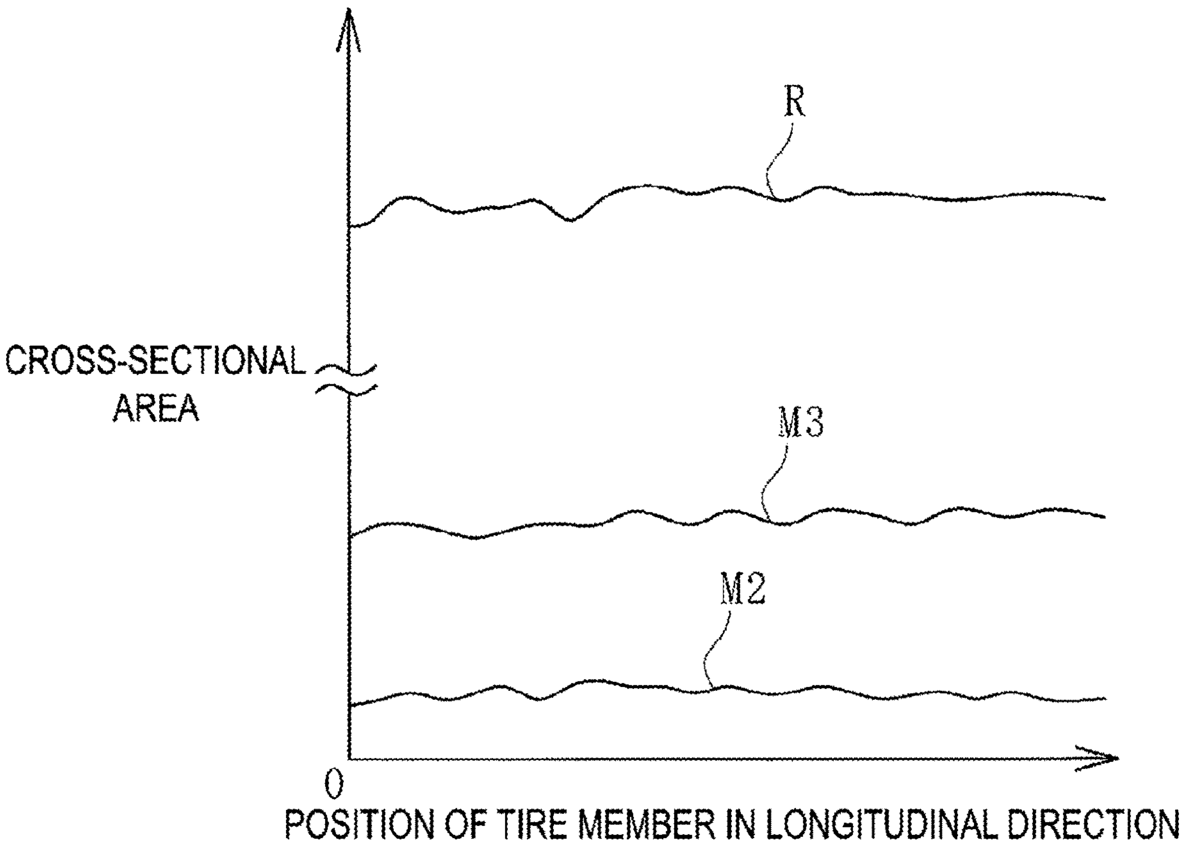
FIG. 8 is an explanatory diagram illustrating the distribution in the longitudinal direction of the cross-sectional areas of constituent members and the tire member.

The terahertz wave measuring device 6 continuously transmits an electromagnetic wave having a terahertz frequency toward the tire member R by the transmitter 6$a$ from the back surface side of the tire member R being conveyed in the longitudinal direction L. The reflected wave entering the tire member R and reflected thereon is detected by the detector 6$b$. Accordingly, the terahertz wave measuring device 6 determines the cross-sectional shapes (cross-sectional areas) of the constituent members M2 and M3. Thus, as illustrated in FIG. 8, the distribution in the longitudinal direction L of the cross-sectional areas of the constituent members M2 and M3 is determined. Since the specific gravity of each of the constituent members M2 and M3 is known, the distribution in the longitudinal direction L of the masses of the constituent members M2 and M3 is also determined.

In the profile sensor 7, the laser beam is continuously applied by the irradiation unit 7$a$ to the tire member R being conveyed in the longitudinal direction L. The laser beam reflected on the outer surface of the tire member R is received by the light receiving unit 7$b$. Accordingly, the profile sensor 7 determines the cross-sectional shape (cross-sectional area) of the tire member R. Consequently, as illustrated in FIG. 8, the distribution in the longitudinal direction L of the cross-sectional area of the tire member R is determined.

Figure 4:
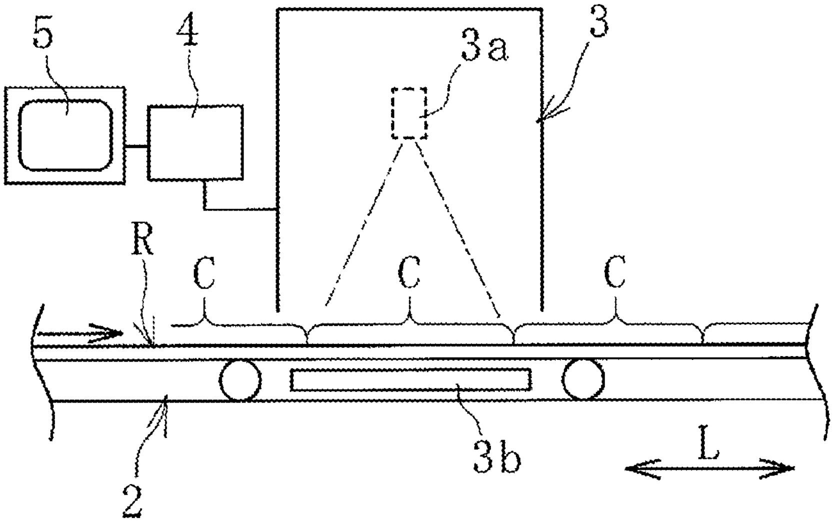
FIG. 4 is an enlarged explanatory diagram illustrating the surroundings of an X-ray inspection device of FIG. 1.
Figure 5:
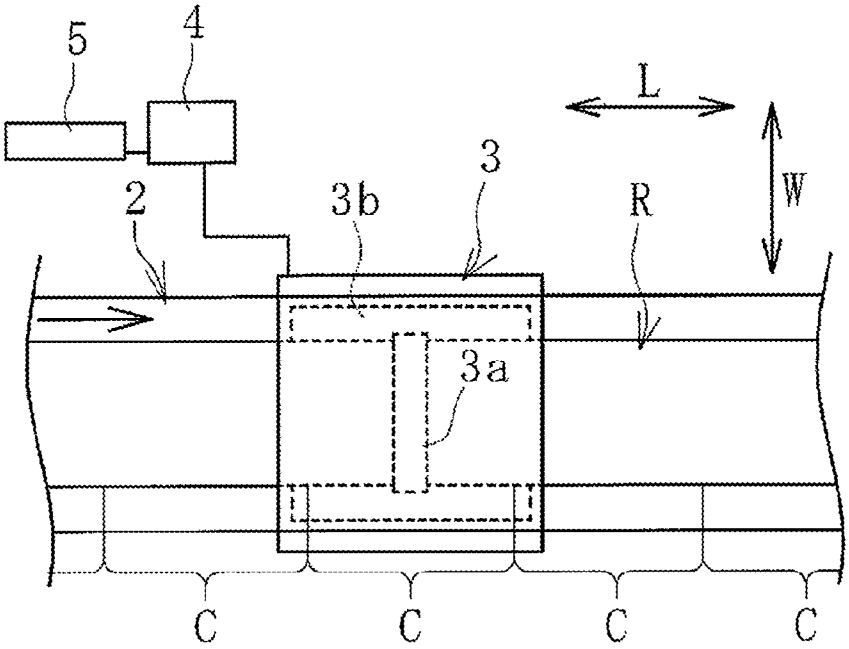
FIG. 5 is an explanatory diagram illustrating the range illustrated in FIG. 4 in a plan view.

Subsequently, as illustrated in FIGS. 4 and 5, while the tire member R is conveyed in the longitudinal direction L, the distribution in the longitudinal direction L of the dimension in the width direction of the constituent member M1 is determined by using the X-ray inspection device 3. Accordingly, the irradiation unit 3$a$ applies X-rays to the predetermined length range C from the top surface side of the tire member R being conveyed. The X-rays transmitted through the predetermined length range C of the tire member R are sequentially received by the light receiving unit 3$b$.

Figure 9:
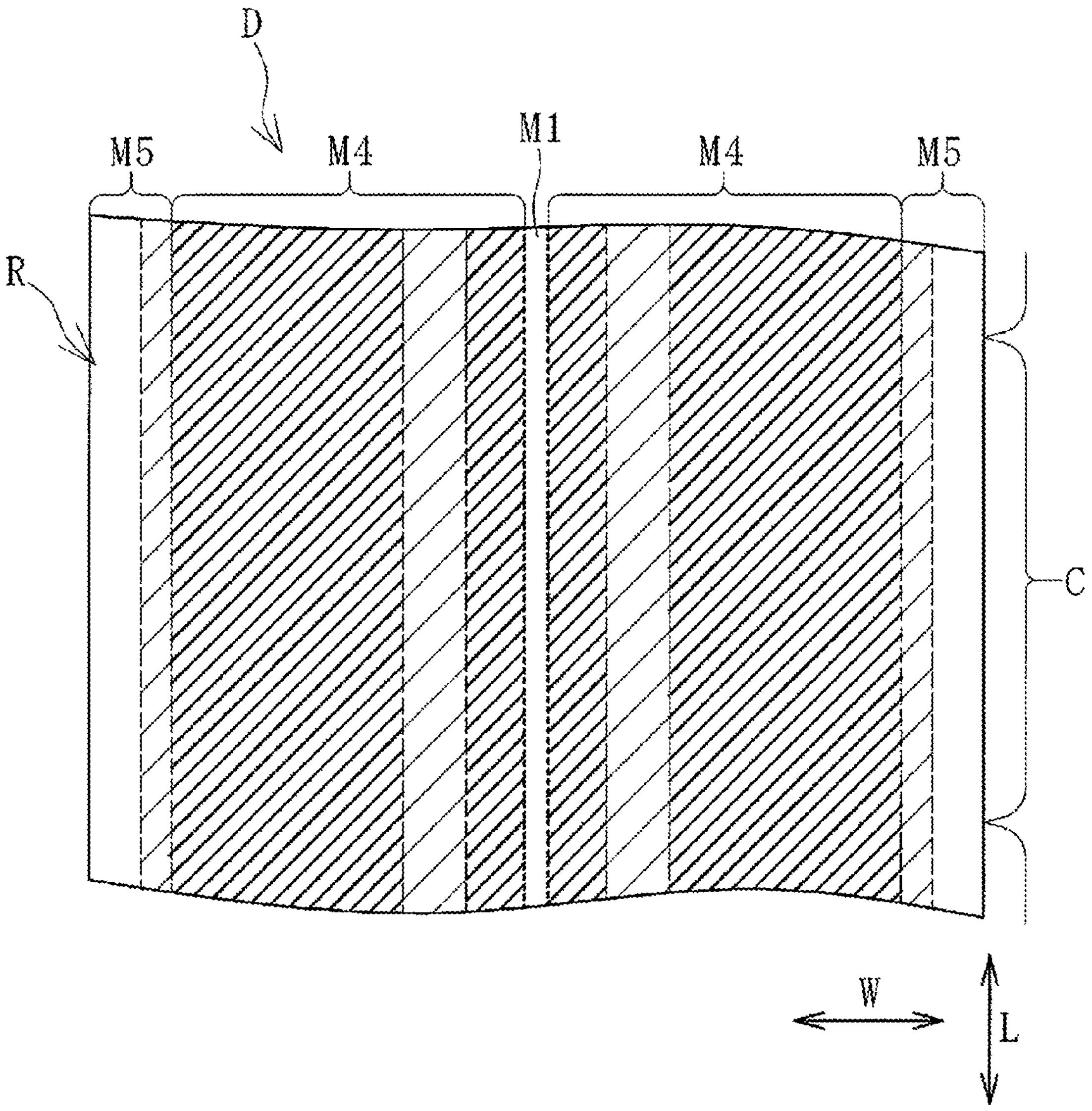
FIG. 9 is an explanatory diagram illustrating image data acquired by the X-ray inspection device of FIG. 1.

Thus, the image data D illustrated in FIG. 9 based on the X-ray transmittance of the predetermined length range C is acquired by the X-ray inspection device 3. Continuously performing a process of acquiring the image data D as just described allows the image data D of the predetermined length range C continuous without gaps in the longitudinal direction L to be acquired. Each piece of the acquired image data D is sequentially input to the calculation device 4, subjected to computational processing, and analyzed. The calculation device 4 calculates, based on the contrast in the image data D, the magnitude of variation (degree of variation) in the dimension in the width direction of the constituent member M1 in the longitudinal direction L. The calculation process by the calculation device 4 will be described in detail below.

The X-rays applied from the irradiation unit 3$a$ pass through the tire member R and are received by the light receiving unit 3$b$. As the thickness of the tire member R increases, the attenuation of the X-rays in the tire member R increases more (the amount of absorption increases), and thus the amount of X-rays received by the light receiving unit 3$b$ (the amount of transmitted X-rays) decreases. When the content of components that easily attenuate X-rays (having high atomic numbers and densities) in the tire member R is high, the amount of X-rays received by the light receiving unit 3*b* (the amount of transmitted X-rays) decreases. Accordingly, the acquired image data D becomes closer to black and becomes darker. On the other hand, as the thickness of the tire member R decreases, the attenuation of the X-rays in the tire member R decreases more (the amount of absorption decreases), and thus the amount of X-rays received by the light receiving unit 3*b* (the amount of transmitted X-rays) increases. When the content of components that easily attenuate X-rays in the tire member R is small, the amount of X-rays received by the light receiving unit 3*b* (the amount of transmitted X-rays) increases. Accordingly, the acquired image data D becomes closer to white and becomes lighter.

Silica is a component that significantly attenuates (absorbs) X-rays as compared with carbon black. Consequently, the image data D of the constituent member M containing silica or having a large content of silica is closer to black and darker than that of the constituent member M containing carbon black instead of silica or having a large content of carbon black. As described above, the contrast in the image data D depends on the thickness and the contained component of the tire member R at the position through which the X-rays pass.

Figure 10:
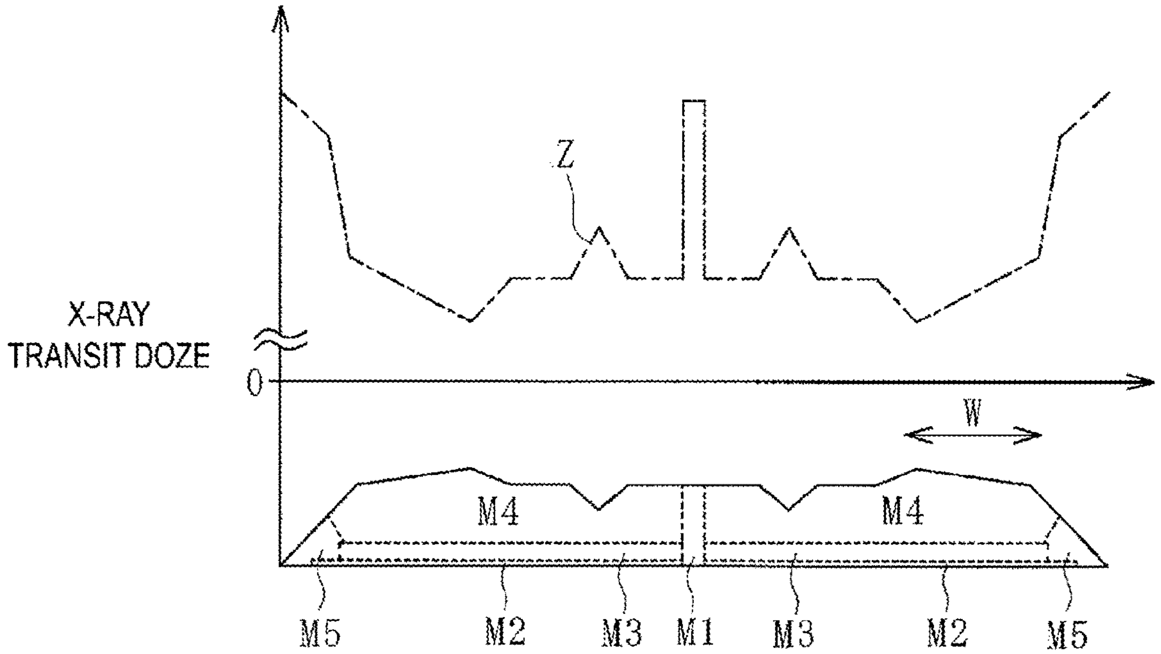
FIG. 10 is a graph illustrating the transit doze of X-rays of the tire member of FIG. 6 at a position in the width direction.

As illustrated by a dot-dash line Z in FIG. 10, a transit doze Z of X-rays of the tire member R changes in a width direction W. In FIG. 10, in order to make it easy to understand the position of the tire member R in the width direction, the transverse cross-sectional view of the tire member R is illustrated below the graph. The transit dose Z indicates the amount of X-rays received on the back surface side when the X-rays are applied from the front surface side of the tire member R. The transit doze Z can be calculated based on the thickness, specific gravity, and attenuation coefficient of the tire member R at the position through which the X-rays pass. The larger the transit doze Z is at the position in the width direction, the darker the color of the image data D is.

Consequently, in the image data D illustrated in FIG. 9, the color is darkest at the thickest position of the constituent member M4, and the color is lightest at the thinnest position. Since the constituent member M1 is the thickest member but has the smallest specific gravity, the color of the image data D is lighter at the position where the constituent member M1 is disposed. At the position where the constituent member M5 is disposed, the color of the image data D becomes lighter toward the end of the tire member R in the width direction. In FIG. 9, the arrangement pitch of diagonal lines is changed in accordance with the color density, and the arrangement pitch of diagonal lines is reduced and densely illustrated in a portion, the color of which is relatively dark.

Thus, in the image data D of FIG. 9, there are dark portions and light portions, and the light portions are present at a plurality of positions (the thinnest position of the constituent member M4, the position of the constituent member M1, and the position of the constituent member M5). As a result, it is difficult to identify which light portion is the position where the constituent member M1 exists only by simple contrast in the image data D. However, in a case where the thickness changes in the same type of unvulcanized rubber, the change of the transit doze Z gradually changes in the same manner as the change of the thickness, and thus the contrast in the image data D gently changes. On the other hand, in the case of different types of unvulcanized rubber, the transit doze Z largely changes due to the difference in the contained components, and thus the contrast in the image data D rapidly changes.

Accordingly, in this embodiment, the transit doze Z in the width direction W of the tire member R illustrated in FIG. 10 is determined in advance, and the magnitude of the difference in the transit doze Z is used. That is, the transit doze Z of each constituent member M is determined in advance, and as illustrated in FIG. 9, a reference range of the magnitude of the difference between the transit dozes Z of the constituent members M at the boundary between the constituent members M adjacent to each other in the width direction W is set. In other words, if the change in the transit doze Z in the width direction W is within the reference range, the reference range is set so as to substantially ensure that the constituent members M1 and M4 are adjacent to each other in the width direction W.

Then, the range of the difference in contrast of the image data D corresponding to the set reference range is stored in the calculation device 4 as a determination reference. The calculation device 4 calculates the magnitude of the difference in contrast in the width direction W with respect to each piece of the image data D. When detecting a position where the difference falls within the determination criterion, the calculation device 4 determines that the detected position in the width direction is the boundary between the constituent members M1 and M4. When one constituent member M1 extends in the longitudinal direction L in the tire member R, the boundary between the constituent members M1 and M4 is detected at two locations spaced apart from each other in the width direction W. The distance between the boundaries in the width direction W is calculated as the dimension in the width direction of the constituent member M1.

Figure 11:
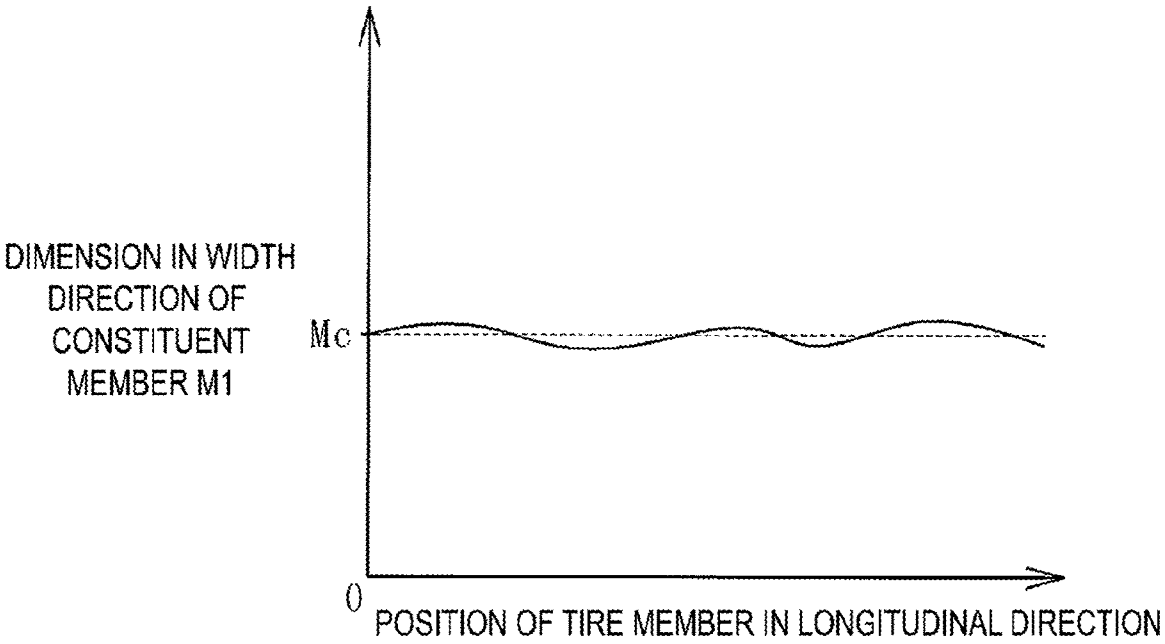
FIG. 11 is a graph illustrating the distribution in the longitudinal direction of a dimension in a width direction of a constituent member M1.

As a result, as illustrated in FIG. 11, the magnitude of variation in the dimension in the width direction of the constituent member M1 of the tire member R in the longitudinal direction L is calculated. Mc on the vertical axis of FIG. 11 indicates a design value of the dimension in the width direction of the constituent member M1, and it can be determined how much the dimension in the width direction of the constituent member M1 varies in the longitudinal direction L in the manufactured tire member R. When the dimension in the width direction is 0 in FIG. 11, it means that the constituent member M1 is interrupted in the middle of the longitudinal direction L. Thus, according to the data of FIG. 11, the continuity of the constituent member M1 in the longitudinal direction L can be determined.

In this embodiment, the X-rays are applied by the irradiation unit 3*a* to the predetermined length range C of the tire member R so as to cover the entire width of the tire member R; however, the position in the width direction at which the constituent member M1 is disposed in the tire member R is determined in advance. Consequently, the range in the width direction in which the X-rays are applied can be set to a narrower range including a position previously determined as the position in the width direction at which the constituent member M1 is disposed.

When the magnitude of the calculated variation in the dimension in the width direction of the constituent member M1 in the longitudinal direction L is within the predetermined allowable range, the corresponding predetermined length range C is determined to be a non-defective portion. Then, the non-defective portion of the tire member R conveyed by the conveying device 2 is guided by the sorting conveyor 12 to the winding machine 10 to be wound thereby. In the case of an extrusion molding direct line or the like, the non-defective portion of the tire member R is conveyed to the next step as it is.

When the magnitude of the calculated variation in the dimension in the width direction of the constituent member M1 in the longitudinal direction L is out of the allowable range, the corresponding predetermined length range C (defective portion) is cut by the cutting machine 11 on the conveying device 2. Then, when the cut predetermined length range C (defective portion) is conveyed to the downstream end portion of the conveying device 2 in the conveying direction, the sorting conveyor 12 pivots toward the discharge conveyor 13. As a result, the cut predetermined length range C (defective portion) is placed and conveyed on the discharge conveyor 13, and then is removed from the manufacturing line.

If the variation in the dimension in the width direction of the constituent member M1 in the longitudinal direction L becomes excessive, the dimension in the width direction is more likely to fall outside the allowable range. Accordingly, the control device 9 controls the rotation speed of the screw 8*s* disposed in at least one of the plurality of extruders 8 based on the magnitude of variation in the dimension in the width direction of the constituent member M1 calculated and determined as described above. For example, the rotation speed of the screw 8*s* of the extruder 8*a* that extrudes the unvulcanized rubber forming the constituent member M1 is controlled to correct the variation in the dimension in the width direction and bring the variation closer to a design value Mc. When the dimension in the width direction of the constituent member M1 is small with respect to the design value Mc, the rotation speed of the screw 8*s* of the extruder 8*a* is increased. When the dimension in the width direction is large with respect to the design value Mc, the rotation speed of the screw 8*s* is decreased. In addition to the extruder 8*a*, by giving priority to the extruder 8 that is greatly affected by the variation in the dimension in the width direction of the constituent member M1, the rotation speed of the screw 8*s* is preferably controlled.

As described above, the image data D acquired by applying the X-rays to the predetermined length range C from the top surface side of the tire member R being conveyed in the longitudinal direction L by the conveying device 2 is used, and thus it is not necessary to stop the conveyance of the tire member R in order to determine the dimension in the width direction of the constituent member M1. Then, the image data D of the predetermined length range C continuous without gaps in the longitudinal direction L is acquired, and the dimension in the width direction of the constituent member M1 can be accurately determined by the calculation device 4 based on the contrast of each piece of the image data D. As a result, it is advantageous to quickly and accurately determine variation in the dimension in the width direction of the constituent member M1 in the longitudinal direction L (i.e., the continuity of the constituent member M1 in the longitudinal direction L). In addition, by controlling the rotation speed of the screw 8*s* as described above based on the magnitude of variation in the dimension in the width direction of the constituent member M1 accurately determined, the variation is reduced, which is advantageous for productively manufacturing the tire member R.

In the embodiment described above, the case where the distribution in the longitudinal direction of the constituent member M1 formed of unvulcanized rubber having a higher content rate of carbon black as a specific component than those of unvulcanized rubber forming the other constituent members M is determined is illustrated as an example. The specific component is not limited to carbon black, but may be another component depending on the purpose. The specific member to be inspected is not limited to the constituent member M1, but may be the other constituent members M.

Next, a case where the distribution of the mass of the tire member R in the longitudinal direction L is determined as the predetermined quality to be inspected by the X-ray inspection device 3 will be described. This distribution can be determined in place of or in addition to the aforementioned magnitude of variation in the dimension in the width direction of the constituent member M1 in the longitudinal direction L.

In advance, the image data D described above is acquired under the same conditions for a large number of samples of the tire member R. Mass data per unit length of each of the samples is also acquired. By performing machine learning on the image data D and the mass data as training data, a prediction model (computer program) for estimating the mass per unit length of the predetermined length range C corresponding to the image data D is generated from the image data D acquired as the inspection object, and the prediction model is stored in the calculation device 4.

Since the contrast in the image data D changes depending on the thickness of the tire member R and the contained component therein as described above, the distribution of the contrast has a correlation with the mass per unit length of a portion (the predetermined length range C) of the tire member R, which corresponds to the image data D. Thus, for example, an estimation model is generated by subdividing the image data D into a large number of minute regions and obtaining, by using machine learning, the correlation between the degree of contrast of each of the minute regions, the position of each minute region, and the like and the mass per unit length corresponding to the image data D. Methods of machine learning that can be used include various known methods such as deep learning using a neural network.

In estimating the mass of each predetermined length range C of the tire member R being conveyed, the image data D sequentially acquired by the X-ray inspection device 3 is input to the estimation model and subjected to computational processing by the calculation device 4. Thus, the mass of each predetermined length range C is estimated and calculated.

Figure 12:
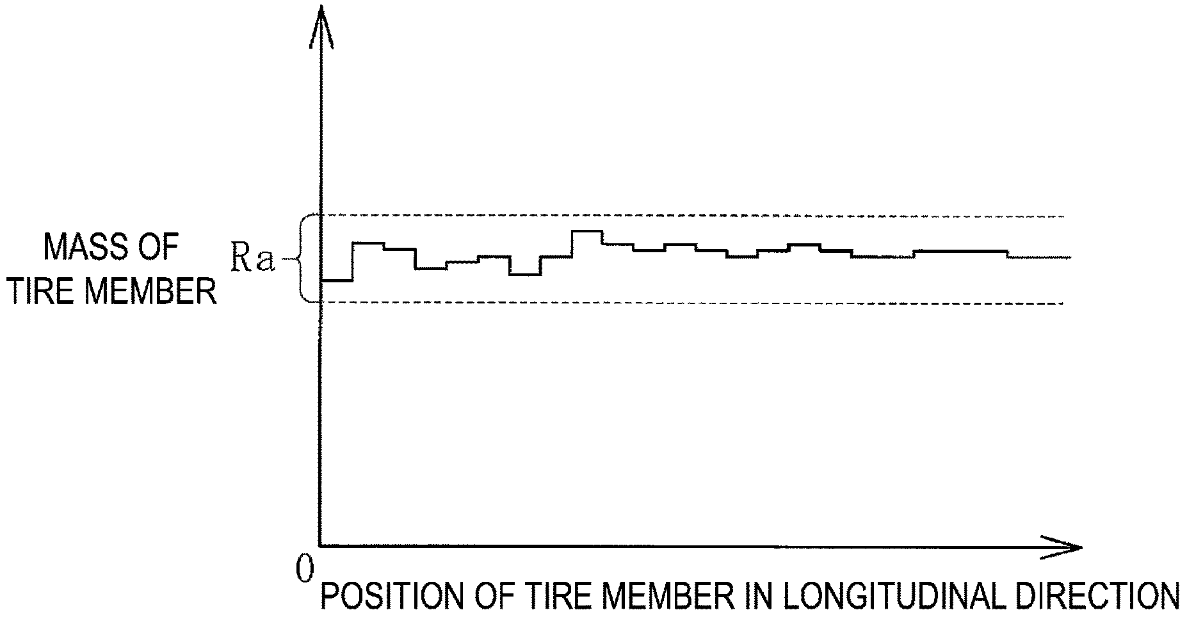
FIG. 12 is a graph illustrating the distribution in the longitudinal direction of the mass of the tire member.

As a result, as illustrated in FIG. 12, the magnitude of variation in the mass (mass per unit length) of the tire member R in the longitudinal direction L is calculated. Ra on the vertical axis of FIG. 12 indicates an allowable range of the mass (mass per unit length) of the tire member R, and according to FIG. 12, how much the mass of the manufactured tire member R varies in the longitudinal direction L can be determined. In FIG. 12, when the mass is within an allowable range Ra, the corresponding predetermined length range C is determined to be a non-defective portion. When the mass falls outside the allowable range Ra, the corresponding predetermined length range C is determined to be a defective portion.

In this embodiment as well the preceding embodiment, the predetermined length range C corresponding to the non-defective portion is guided by the sorting conveyor 12 to the winding machine 10. The predetermined length range C corresponding to the defective portion is cut by the cutting machine 11 on the conveying device 2, guided by the sorting conveyor 12 to the discharge conveyor 13, and then removed from the manufacturing line.

When the variation in the mass of the tire member R in the longitudinal direction L becomes excessive, the mass of the tire member R is more likely to fall outside the allowable range Ra. Accordingly, the control device 9 controls the rotation speed of the screw 8*s* disposed in at least one of the plurality of extruders 8 based on the magnitude of variation in the mass of the tire member R calculated and determined as described above. This control allows the variation in the mass of the tire member R in the longitudinal direction L to be corrected and the mass to be maintained within the allowable range Ra.

In this embodiment, the position in the width direction and the dimension in the width direction of the constituent member M1 are determined by the X-ray inspection device 3, and the cross-sectional shape of the tire member R is determined by the profile sensor 7. Accordingly, the cross-sectional area and mass of the constituent member M1 can also be determined. The cross-sectional areas and masses of the constituent members M2 and M3 are also determined by the terahertz wave measuring device 6. Accordingly, when the cross-sectional areas (masses) of the constituent members M1, M2, and M3 are subtracted from the determined cross-sectional area (mass) of the tire member R, the sum of the cross-sectional areas (masses) of the constituent members M4 and M5 is determined. Since the cross-sectional area (mass) of the constituent member M5 is very small with respect to the constituent member M4, the cross-sectional area (mass) of the constituent member M4 can also be substantially determined. Consequently, based on the determined magnitude of variation in the cross-sectional area (mass) of each of the constituent members M2, M3, and M4 in the longitudinal direction L, the control device 9 controls the rotation speed of the screw 8*s* disposed in at least one of the plurality of extruders 8 to correct the variation in the cross-sectional area (mass) of each constituent member in the same manner as the correction of the variation in the dimension in the width direction of the constituent member M1. As a result, the variation in the mass of the tire member R in the longitudinal direction L is corrected.

Figure 13:
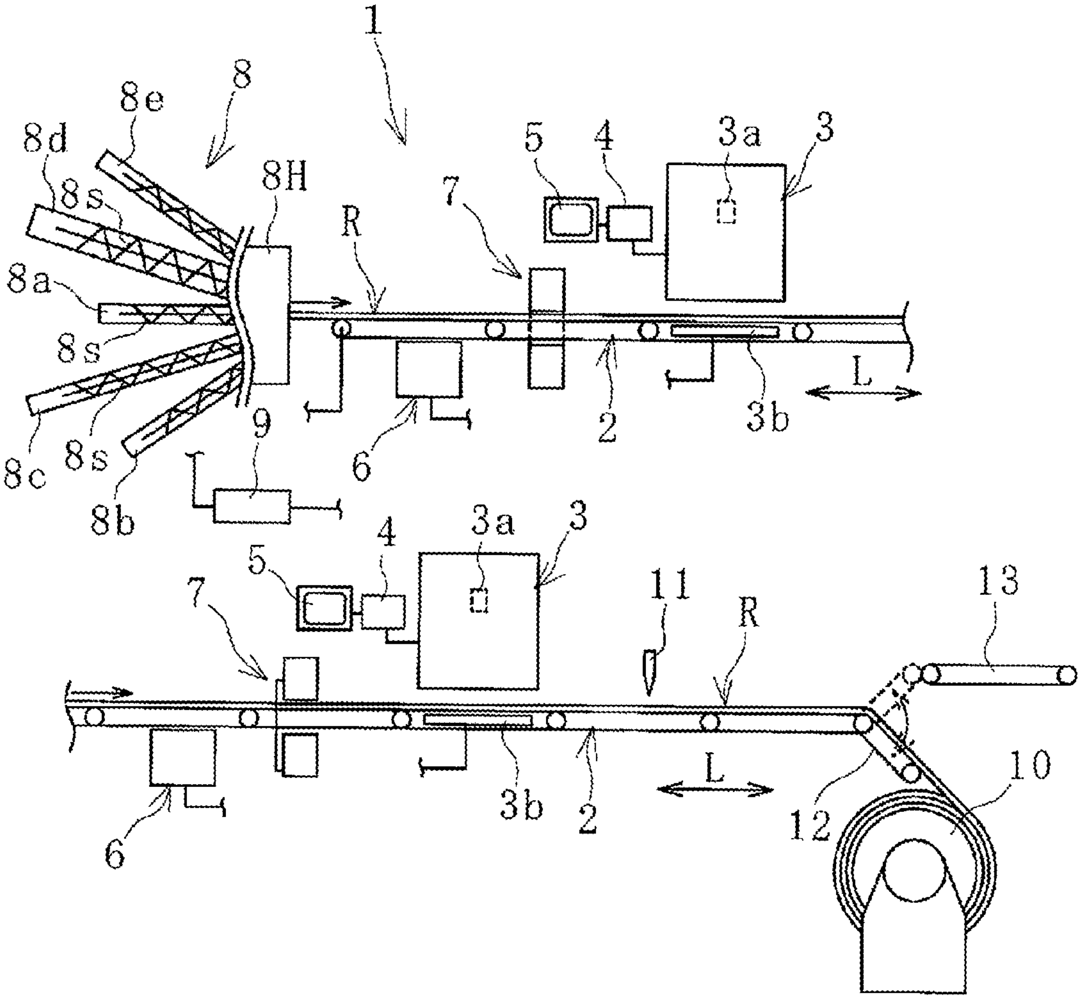
FIG. 13 is an explanatory diagram illustrating another embodiment of the system for manufacturing a tire member in a side view.

In the embodiment of the manufacturing system 1 illustrated in FIG. 13, groups of the terahertz wave measuring device 6, the profile sensor 7, and the X-ray inspection device 3 are disposed at two positions separated from each other in the longitudinal direction L of the conveying device 2. That is, in this embodiment, a group of the terahertz wave measuring device 6, the profile sensor 7, and the X-ray inspection device 3 is added on the downstream side in the conveying direction of the conveying device 2 with respect to the manufacturing system 1 illustrated in FIG. 1.

A group of the terahertz wave measuring device 6, the profile sensor 7, and the X-ray inspection device 3 disposed on the upstream side in the conveying direction of the conveying device 2 functions in the same manner as in the preceding embodiment. That is, this group inspects quality of the tire members R and feeds back the inspection results for the control of the rotation speed of the screw 8*s* by the control device 9. On the other hand, the group disposed on the downstream side in the conveying direction functions to inspect quality of the tire members R and simply determine whether the inspection results satisfy the allowable range.

The invention claimed is:

1. A method for manufacturing a tire member for manufacturing, while determining a predetermined quality of an elongated tire member formed by bonding a plurality of types of constituent members made of unvulcanized rubber extruded by a plurality of respective extruders, the tire member, the method comprising:

continuously performing a process of applying X-rays to a predetermined length range of the tire member from a top surface side of the tire member while conveying the tire member in a longitudinal direction to acquire image data based on X-ray transmittance of the predetermined length range;

acquiring the image data of the predetermined length range continuous without gaps in the longitudinal direction;

determining, based on contrast in each piece of the image data which resulted from subjecting each piece of the image data acquired to computational processing and analysis, a magnitude of variation in the predetermined quality of the tire member in the longitudinal direction; and correcting the variation by controlling, based on the magnitude of the variation determined, a rotation speed of a screw disposed in at least one of the plurality of extruders; wherein a distribution in the longitudinal direction of a dimension in a width direction of a specific constituent member of the constituent members, which is formed of unvulcanized rubber having a higher content rate of a specific component than content rate of unvulcanized rubber forming the other constituent members is determined as the predetermined quality; and a transit doze of X-rays of each of the constituent members adjacent to each other in the width direction of the tire member is determined in advance, a reference range of the magnitude of the difference between the transit dozes of each of the constituent members at the boundary between each of the constituent members is set, the reference range is used to define a determination criterion for a difference in contrast in the image data, boundary positions between adjacent constituent members are detected where the difference in contrast satisfies the determination criterion, and a width dimension of a specific one of the constituent members is calculated as a distance in the width direction between two detected boundary positions.

2. The method for manufacturing a tire member according to claim 1, wherein the specific component is carbon black.

3. The method for manufacturing a tire member according to claim 2, wherein a distribution in the longitudinal direction of a mass of the tire member is determined as the predetermined quality.

4. The method for manufacturing a tire member according to claim 3, wherein a distribution in the longitudinal direction of a cross-sectional area of the tire member is determined by applying a laser beam to the tire member being conveyed in the longitudinal direction and receiving reflected light reflected on an outer surface of the tire member.

5. The method for manufacturing a tire member according to claim 4, wherein a distribution in the longitudinal direction of a cross-sectional area of at least one type of the constituent members unevenly distributed on a back surface side of the tire member is determined by transmitting an electromagnetic wave having a terahertz frequency from the back surface side of the tire member being conveyed in the longitudinal direction toward the tire member and detecting a reflected wave entering the tire member and reflected thereon.

6. The method for manufacturing a tire member according to claim 1, wherein a distribution in the longitudinal direction of a mass of the tire member is determined as the predetermined quality.

7. The method for manufacturing a tire member according to claim 6, wherein the image data of a large number of samples of the tire member is acquired, mass data per unit length of each of the samples is acquired, an estimation model which estimates the mass per unit length of the predetermined length range corresponding to the image data is generated from the image data acquired as an inspection object by performing machine learning on the image data and the mass data of each of the samples as training data, and in acquiring a distribution of the mass of the tire member in the longitudinal direction while conveying the tire member in the longitudinal direction, each piece of the image data acquired is input to the estimation model and calculate mass per unit length of each of the predetermined length range.

8. The method for manufacturing a tire member according to claim 1, wherein a distribution in the longitudinal direction of a cross-sectional area of the tire member is determined by applying a laser beam to the tire member being conveyed in the longitudinal direction and receiving reflected light reflected on an outer surface of the tire member.

9. The method for manufacturing a tire member according to claim 1, wherein a distribution in the longitudinal direction of a cross-sectional area of at least one type of the constituent members unevenly distributed on a back surface side of the tire member is determined by transmitting an electromagnetic wave having a terahertz frequency from the back surface side of the tire member being conveyed in the longitudinal direction toward the tire member and detecting a reflected wave entering the tire member and reflected thereon.

10. The method for manufacturing a tire member according to claim 1, wherein, in a process for acquiring the image data, an X-ray inspection device including an irradiation unit and a light receiving unit which are disposed vertically sandwiching the tire member is used, the irradiation unit applies the X-rays and the X-rays transmitted through the tire member are received by the light receiving unit.

11. A system for manufacturing a tire member comprising a plurality of extruders configured to extrude constituent members made of a plurality of different types of unvulcanized rubber and manufacturing, while determining a predetermined quality of an elongated tire member formed by bonding the plurality of types of constituent members, the tire member, the system comprising:

a conveying device configured to convey the tire member in a longitudinal direction;

an X-ray inspection device configured to apply X-rays to a predetermined length range of the tire member from a top surface side of the tire member being conveyed by the conveying device to acquire image data based on X-ray transmittance of the predetermined length range;

a calculation device to which the image data is input; and a control device configured to control rotation of a screw disposed in each of the extruders and having a configuration in which a process of acquiring the image data is continuously performed, the image data of the predetermined length range continuous without gaps in the longitudinal direction is acquired, based on contrast in each piece of the image data which resulted from each piece of the image data acquired being subjected to computational processing and analysis by the calculation device, a magnitude of variation in the predetermined quality of the tire member in the longitudinal direction is calculated by the calculation device, and the variation is corrected by controlling, based on the magnitude of the variation calculated, a rotation speed of a screw disposed in at least one of the extruders by the control device; wherein a distribution in the longitudinal direction of a dimension in a width direction of a specific constituent member of the constituent members, which is formed of unvulcanized rubber having a higher content rate of a specific component than content rate of unvulcanized rubber forming the other constituent members is determined as the predetermined quality; and a transit doze of X-rays of each of the constituent members adjacent to each other in the width direction of the tire member is determined in advance, a reference range of the magnitude of the difference between the transit dozes of each of the constituent members at the boundary between each of the constituent members is set, the reference range is used to define a determination criterion for a difference in contrast in the image data, boundary positions between adjacent constituent members are detected where the difference in contrast satisfies the determination criterion, and a width dimension of a specific one of the constituent members is calculated as a distance in the width direction between two detected boundary positions.

12. The system for manufacturing a tire member according to claim 11, wherein the X-ray inspection device includes an irradiation unit and a light receiving unit which are disposed vertically sandwiching the tire member, the irradiation unit applies the X-rays, and the X-rays transmitted through the tire member are received by the light receiving unit.

13. The system for manufacturing a tire member according to claim 11, further comprising:

a profile sensor determining a distribution in the longitudinal direction of a cross-sectional area of the tire member by applying a laser beam to the tire member being conveyed by the conveying device and receiving reflected light reflected on an outer surface of the tire member, and a terahertz wave measuring device determining a distribution in the longitudinal direction of a cross-sectional area of at least one type of the constituent members unevenly distributed on a back surface side of the tire member by transmitting an electromagnetic wave having a terahertz frequency from the back surface side of the tire member being conveyed by the conveying device toward the tire member and detecting a reflected wave entering the tire member and reflected thereon.

14. The system for manufacturing a tire member according to claim 13, wherein groups of the X-ray inspection device, the profile sensor and the terahertz wave measuring device are disposed at two positions separated from each other in the longitudinal direction of the conveying device.

* * * * *